Oct. 6, 1953          E. F. OHLENDORF          2,654,199
POWER-DRIVEN STALK CUTTER
Filed Dec. 18, 1948          8 Sheets-Sheet 1
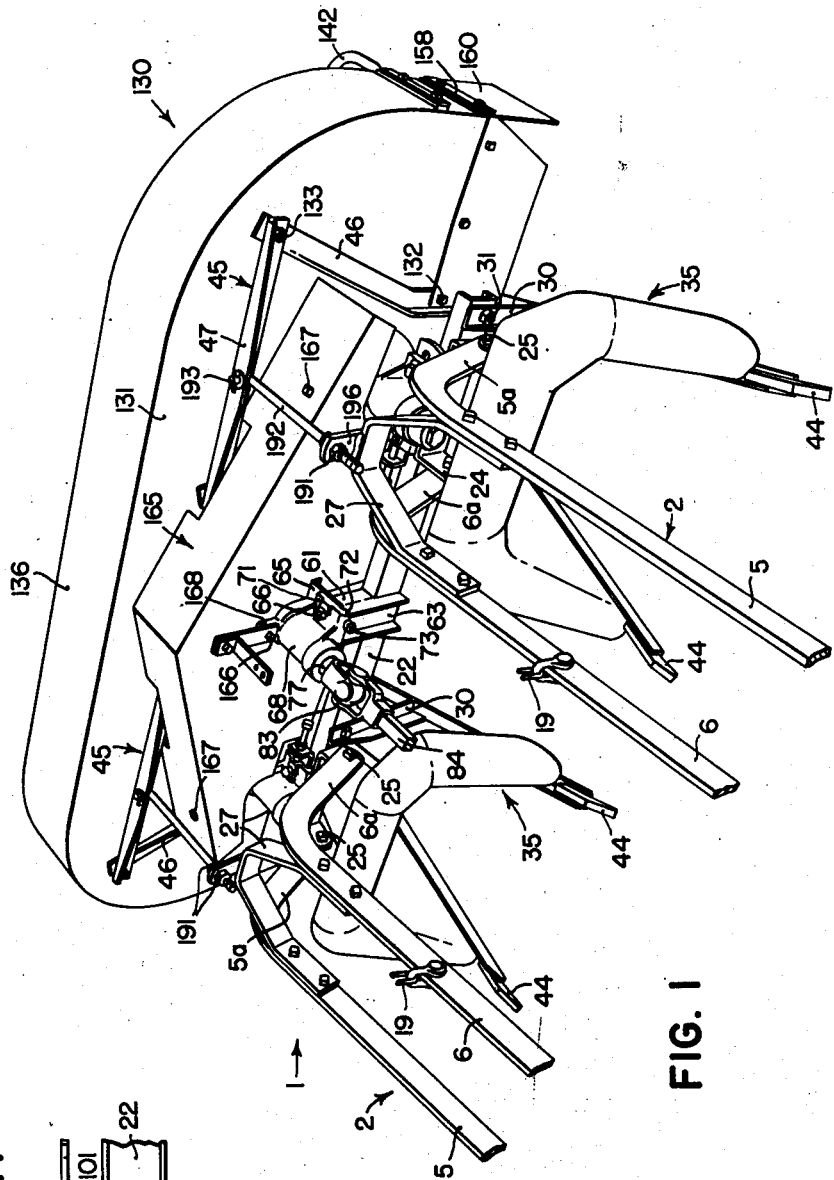
FIG. 1
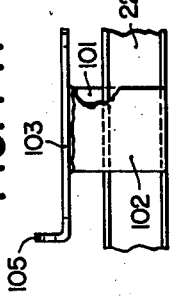
FIG. 7-A
FIG. 7-B
*INVENTOR.*
EMIL F. OHLENDORF
BY
ATTORNEYS

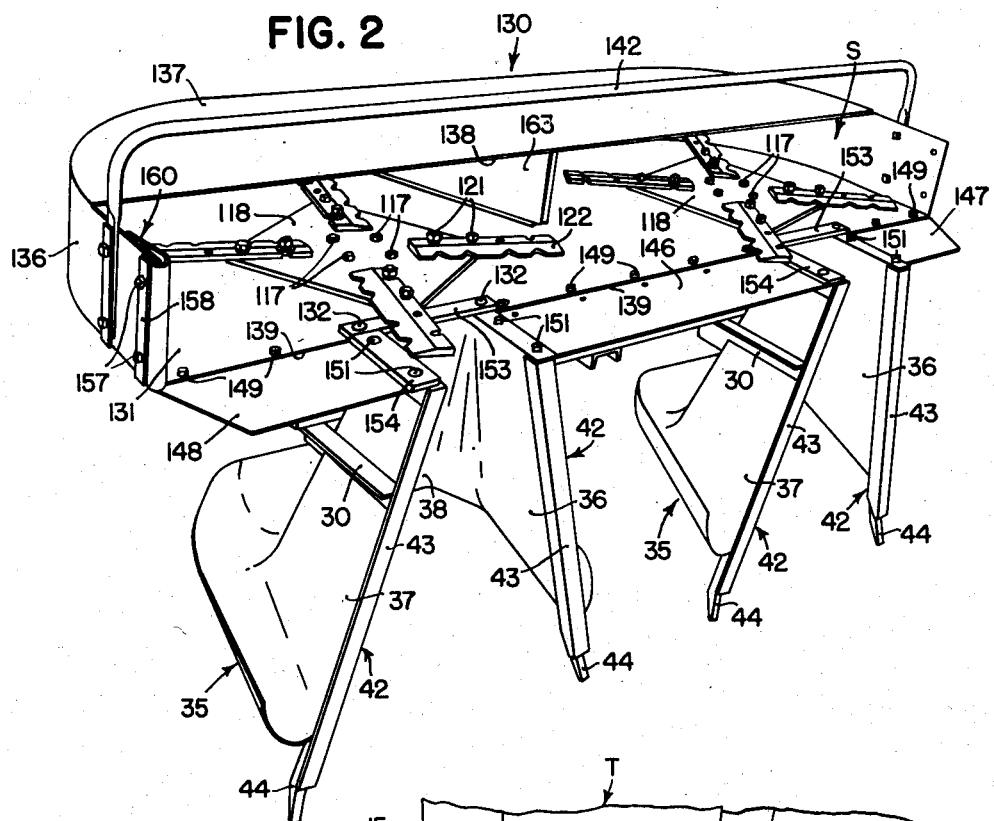

Oct. 6, 1953  E. F. OHLENDORF  2,654,199
POWER-DRIVEN STALK CUTTER
Filed Dec. 18, 1948  8 Sheets-Sheet 3

*INVENTOR.*
EMIL F. OHLENDORF
BY
ATTORNEYS

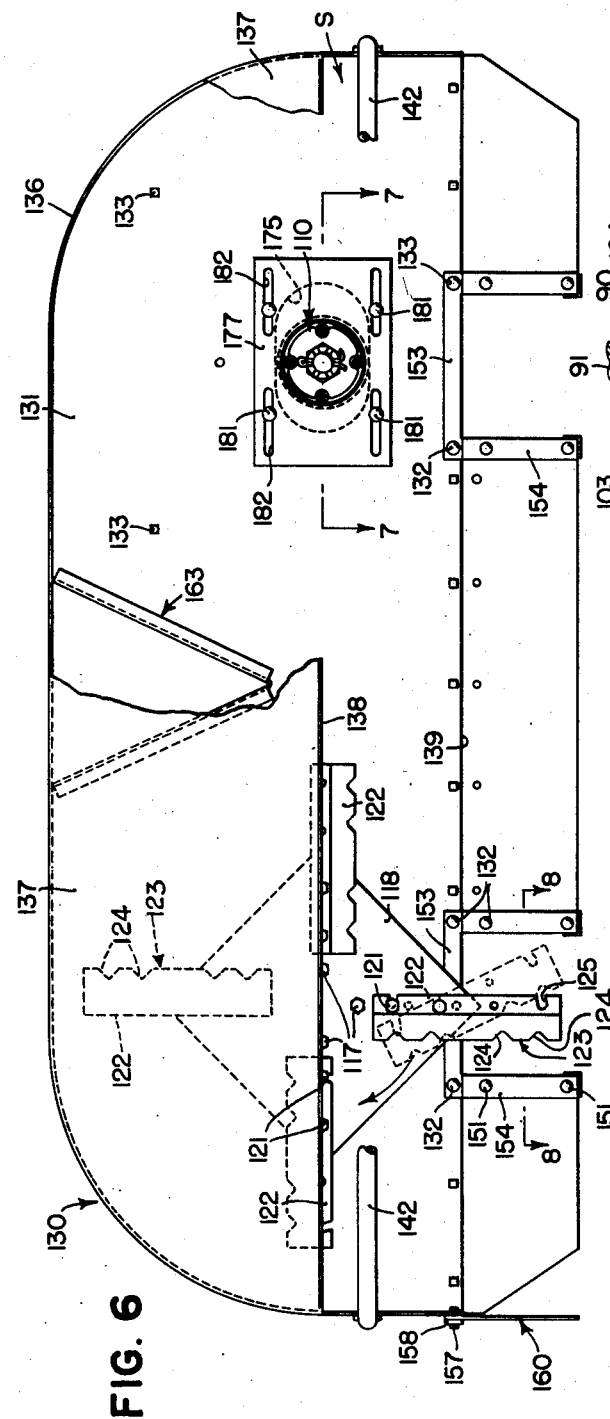
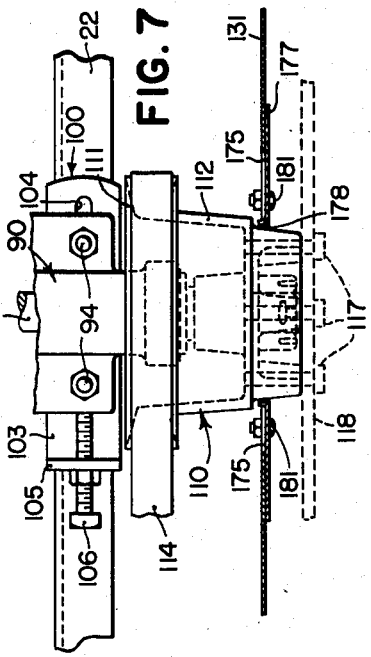
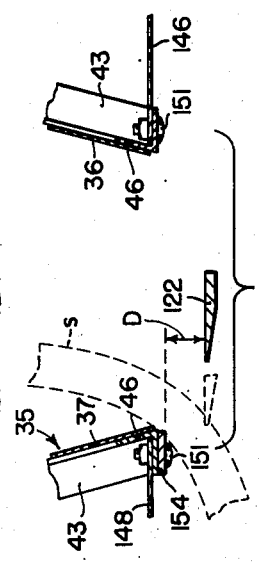

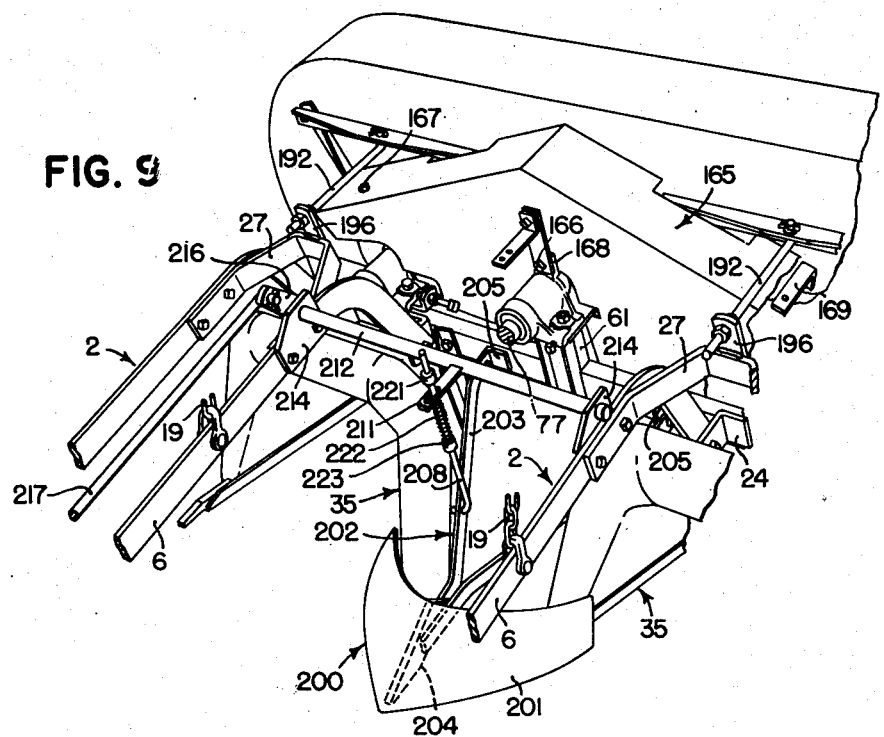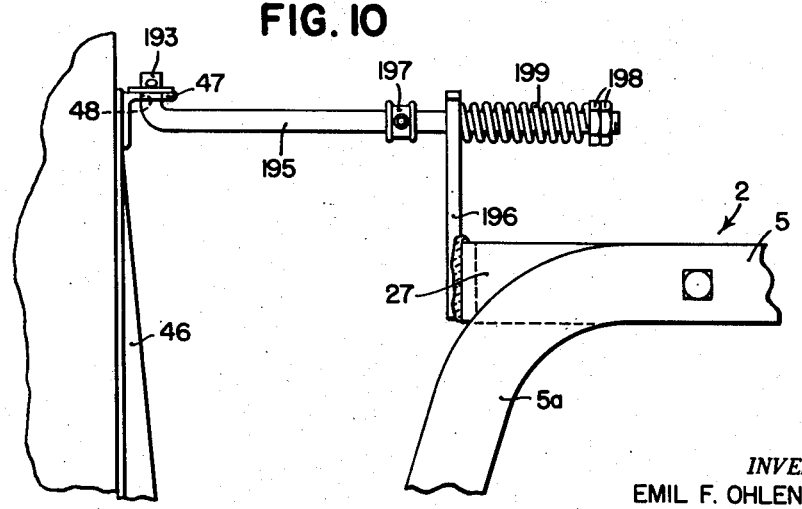

Oct. 6, 1953      E. F. OHLENDORF      2,654,199
POWER-DRIVEN STALK CUTTER

Filed Dec. 18, 1948      8 Sheets-Sheet 6

INVENTOR.
EMIL F. OHLENDORF

BY
ATTORNEYS

Oct. 6, 1953     E. F. OHLENDORF     2,654,199
POWER-DRIVEN STALK CUTTER

Filed Dec. 18, 1948     8 Sheets-Sheet 7

*INVENTOR.*
EMIL F. OHLENDORF
BY
ATTORNEYS

Oct. 6, 1953     E. F. OHLENDORF     2,654,199
POWER-DRIVEN STALK CUTTER
Filed Dec. 18, 1948     8 Sheets-Sheet 8
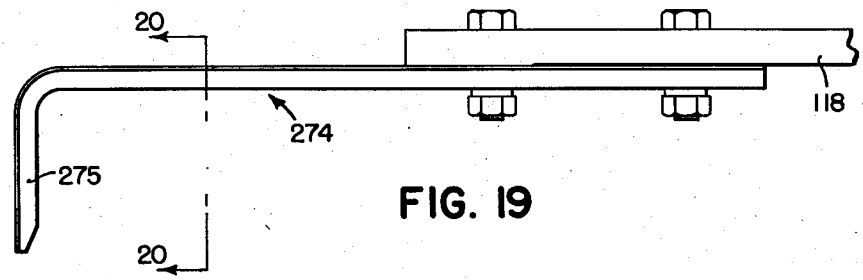
FIG. 19
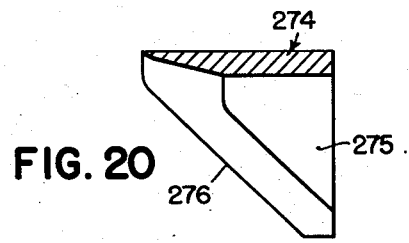
FIG. 20
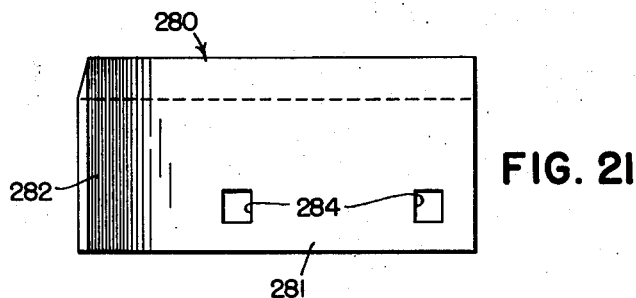
FIG. 21
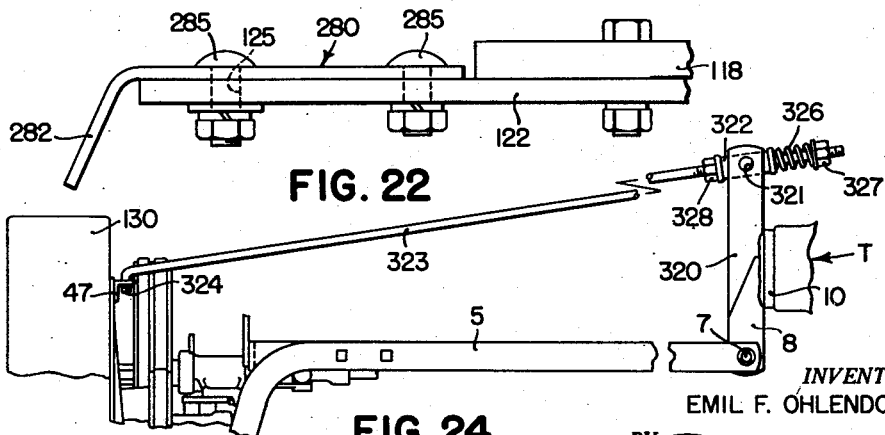
FIG. 22
FIG. 24
INVENTOR.
EMIL F. OHLENDORF
BY
ATTORNEYS Patented Oct. 6, 1953

2,654,199

UNITED STATES PATENT OFFICE 2,654,199

POWER-DRIVEN STALK CUTTER

Emil F. Ohlendorf, Moline, Ill., assignor to Deere & Company, Moline, Ill., a corporation of Illinois Application December 18, 1948, Serial No. 66,020

11 Claims. (Cl. 55—118)

This invention relates generally to agricultural machines and more particularly to a machine for shredding or disintegrating standing crop stalks in the field, such as corn stalks, cotton stalks and the like, and for scattering the shredded or disintegrated particles for facilitating the destruction of insects, such as boll weevils, corn borers and the like, and for facilitating the return of the stalk material to the soil as humus.

The object and general nature of the present invention is the provision of a stalk shredder or like machine which may readily be mounted on a farm tractor and driven by power derived from the tractor motor. More particularly, it is a feature of this invention to provide means for guiding stalks lying on the ground, crosswise of the rows, or the like into the stalk shredding units, and another feature of this invention is the provision of means, preferably associated with the shredding knives, for insuring the passage of the stalks to the shredding units.

A further feature of this invention is the provision of new and improved means for mounting and supporting the bearings of the various parts, particularly the rotating knives so that proper alignment is maintained at all times.

These and other objects and advantages of the present invention will be apparent to those skilled in the art after a consideration of the following detailed description, taken in conjunction with the accompanying drawings.

In the drawings:

Figure 1 is a perspective view of a tractor-mounted stalk cutter or shredder in which the principles of the present invention have been incorporated.

Figure 2 is a perspective view looking at the lower rear portion of the stalk shredder shown in Figure 1.

Figure 3 is a fragmentary perspective view showing the connection of the draft frames to the propelling tractor.

Figure 6 is a rear enlarged view of the stalk shredder shown in Figure 5.

Figure 7 is a fragmentary sectional view on an enlarged scale taken along the section line 7—7 of Figure 6.

Figure 7a is a detailed view of one of the rotor bearing supports.

Figure 7b is a view of Figure 7a looking from the right to the left.

Figure 8 is a fragmentary view showing the action of the cutting knives in drawing loose stalks through the stalk tunnels.

Figure 9 is a fragmentary perspective view similar to Figure 1, showing the provision of an auxiliary stalk-guiding means disposed between the two main stalk-guiding means and operating to pick up stalks and the like that are down on the ground, particularly stalks between the rows.

Figure 10 is a modified form of connection between the rotor housing and the draft frames.

Figure 19 is a side view of a further modified blade for use in close proximity to the ground.

Figure 20 is a sectional view taken on line 20—20 of Figure 19.

Figure 21 is a top plan view of an auxiliary cutter blade extension.

Figure 22 is a side view of the auxiliary cutter blade shown in Figure 21, attached to a blade of the character shown in Figure 6.

Figure 24 shows a modified construction in which the stalk cutter or shredder is connected to the tractor by parallel links.

Figure 4:
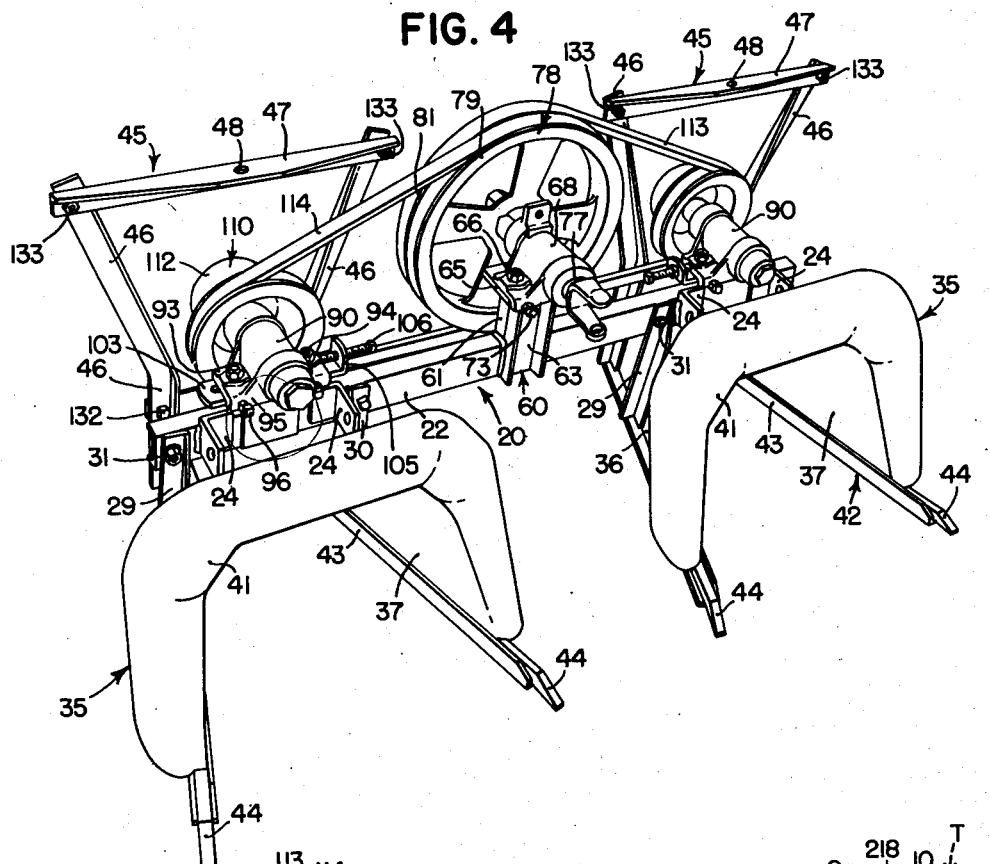
Figure 4 is a perspective enlarged view showing the details of the rotor driving mechanism.

Referring now to the drawings, particularly Figure 1, the operating unit of the stalk shredder is indicated in its entirety by the reference numeral 1 and is connected with the rear axle of the propelling tractor by a pair of draft members or draft frames 2. Each of the latter includes generally fore and aft extending bars 5 and 6 whose forward ends are pivoted to a pair of depending brackets 8 and 9 fixed, as by welding, to an attachment plate 10. The latter member is secured by the usual stud bolts 11 to the tractor T. The latter is provided with the usual power take-off unit 15 which includes a transverse rock-shaft 16 which carries lifting arms 17 the rear ends of which are slotted to receive selected links of a chain 19 that extends downwardly and connects each power lift arm 17 with the laterally inner bar 6 of the associated draft frame. By virtue of the one-way connection between the arms 17 and draft frame 2, the latter may move upwardly relative to the tractor at any time during operation.

Figure 5:
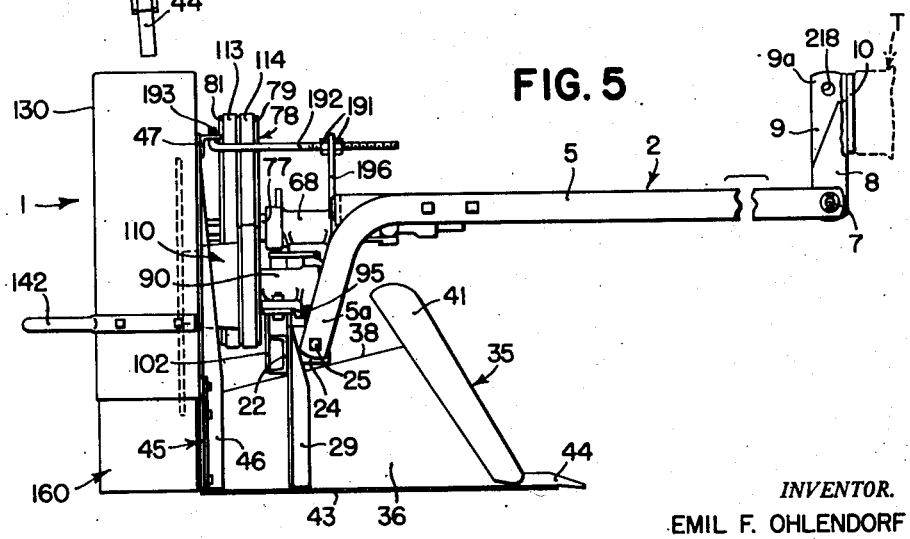
Figure 5 is a fragmentary side view of the rear portion of a stalk shredder in which the principles of the present invention have been incorporated.

The frame of the stalk cutter is indicated in its entirety by the reference numeral 20 and comprises a transverse rigid part in the form of a channel 22 disposed transversely behind the tractor and disposed with its flanges extending rearwardly, as best shown in Figure 5. Secured to the forward side of the channel 22 adjacent each end thereof is a pair of pivot brackets 24 to which the downturned ends 5a and 6a of the associated draft frame member 2 are pivotally connected, as by pivot bolts 25. The rear portions of each pair of draft frame bars 5 and 6 are reenforced by a U-shaped cross member 27 to which reference will be made below. Secured to the channel 22 alongside the pivot brackets 24 are pairs of downwardly extending angles 29 and 30, the upper end of each angle preferably being secured, as by a bolt 31, to the transverse frame channel 22.

Stalk-guiding means in the form of tunnels, each indicated in its entirety by the reference numeral 35, is secured to the transverse frame channel 22 by the angles 29 and 30. Each of the stalk-guiding members 35 comprises side sheets 36 and 37 and an upper or top sheet 38 which are fastened together in any suitable way and converge rearwardly, as best indicated in Figures 2 and 5. The front portions of the sides and top 36, 37 and 38 are shaped to form rounded stalk-guiding sections 41, and the lower edges of the sides 36 and 37 are rigidly secured to ground-engaging runners 42 which are formed of angles 43 and stalk-lifting points 44. The angles 43 are securely fixed, as by welding, to the lower ends of the frame angles 29 and 30. Preferably, also, the frame angles 29 and 30 are welded to the sides 36 and 37 at one or more points.

At its rear end, each of the stalk-guiding tunnels 35 has secured thereto a generally vertically disposed sub-frame member 45, each member 45 being made up of a pair of vertical frame angles 46, which diverge upwardly, as best shown in Figure 4, and an upper cross angle 47 which is apertured centrally. The lower ends of the frame angles 46 are securely fixed, as by welding, to the sides 36 and 37 of the tunnels 35 and also to the rear end of the runner angles 43. By virtue of the structure just described, the two stalk-guiding tunnels 35 and the vertically extending laterally spaced apart sub-frame members 46 are rigidly and securely connected to the cross frame channel 22 whereby the whole constitutes a rigid sturdy unit.

The stalk-cutting or shredding rotors and the drive mechanism associated therewith are, according to the principles of the present invention, supported rigidly and firmly on the rigid cross channel member 22. To this end, the central portion of the channel 22 is provided with a drive shaft pedestal 60 which is made up of a short channel 61 disposed in the plane of the channel 22 and welded at its lower end thereto and a longer channel 63 which is arranged back to back with respect to the channel 61 and extended downwardly along the front face of the channel 22, and welded thereto, as best shown in Figure 4. Secured to the upper ends of the two channel sections 61 and 63, which are flush, is a center bearing plate 65 having a pair of openings to receive the bolts 66 by which a journal box member 68 is rigidly secured to the upper end of the pedestal 60. The journal box 68 includes a base 71 apertured to receive the attaching bolts 66 and a front downwardly extending flange section 72 which is tapped to receive a pair of adjusting set screws 73. The bolt holes in the several parts are sufficiently larger than the clamping bolts 66 so that by loosening the clamping bolts 66 and adjusting one or the other of the adjusting set screws 73, which bear at the inner ends against the forward edge of the plate 65, the position of the journal box 68 on the transverse frame member 22 may be adjusted. Supported for rotation by suitable bearing means within the journal box 68 is a drive shaft 77 on the rear end of which a double pulley 78 is fixed. The member 78 includes a forward pulley section 79 and a rear pulley section 81. Secured to the forward end of the shaft 77 is a universal joint 83 by which the drive shaft 77 is connected to the power take-off shaft of the propelling tractor, as by a telescopic shaft means 84 or the like. The shaft connection 84 includes a universal joint (not shown) at its forward end whereby power is transmitted from the tractor power take-off to the drive pulley 78 in different positions of the stalk shredder relative to the tractor.

Mounted on each outer end portion of the rigid transverse frame channel 22 is a rotor shaft journal box 90 in which a rotor shaft 91 is mounted for rotation. Each journal box 90 includes a base section 93 which is apertured to receive attaching bolts 94, and a forward flange 95 which is tapped to receive adjusting cap screws 96. Preferably, but not necessarily, the journal boxes 90 are substantially the same as or identical with the drive shaft journal box 68. Each rotor shaft journal box 90 is mounted for transverse adjustment along the transversely disposed frame channel 22, and to this end each end portion of the channel 22 is provided with a specially constructed support for the associated journal box to insure that the latter when being adjusted is shifted substantially directly toward and away from the centrally disposed drive shaft 77 so as to avoid any misalignment between the drive and driven pulleys. As best shown in Figure 7, each rotor shaft journal box support is indicated by the reference numeral 100 and comprises a pair of vertically extending plates 101 and 102 secured, as by welding, to opposite sides of the channel 22, and at their upper ends the plates 101 and 102 are welded to a transversely extending bearing plate 103 which is slotted, as at 104, and has an upturned end 105 tapped to receive an adjusting screw 106. The upper surfaces of the bearing plates 103 are accurately parallel to the upper surface of the center bearing plate 65. The slots 104 receive the attaching bolts 94, and the flange 95 overhangs the forward edge of the associated bearing plate 103. The adjusting cap screws 96 on each of the rotor shaft journal boxes 90 provide for bringing these parts accurately into the proper position to secure and maintain parallelism of the rotor shafts with respect to one another and the drive shaft 77. Each rotor shaft 91 at its outer end receives and supports a pulley member 110 which, as best shown in Figure 7, includes a pulley section 111 and a hollow cup-like hub section 112 which is fastened in any suitable way on the outer or rear end of the associated rotor shaft 91. The pulley members 110 at the right and left hand side of the machine are substantially identical, except that the pulley section 111 of the left hand member is disposed a short distance rearwardly as compared with the right hand member so as to accommodate the disposition of the left hand driving belt 113 in a plane which is rearwardly of the plane of the right hand driving belt 114, as best shown in Figure 4. The belts are tightened and maintained in the proper degree of tautness by a proper adjustment of the adjusting screws 106, and the set screws 96 and associated parts maintain the planes of the rotor shaft pulley sections 111 accurately coincidental with the planes of the corresponding drive pulley sections 79 and 81, whereby there is substantially no tendency for the pulleys to get out of line, with resultant excessive wear or improper operation of the drive belts 113 and 114.

The hub section 112 of each of the pulley members 110 is provided with a plurality of rearwardly directed apertured lugs, the apertures of which are tapped to receive cap screws 117 which attach a knife plate 118 rigidly to the hub portion 112. Each knife plate 118 is preferably of square configuration but may be of any suitable shape as desired. In the preferred form of my invention, the corner portions of each plate 118 is provided with a pair of radially spaced apertures 119 to receive attaching bolts 121 which fix the associated shredding knives 122 to the rotor plate 118. Preferably, there are four knives 122 fixed to each rotor plate 118 and, as best shown in Figure 6, each of the knives is provided with a cutting edge 123 having a plurality of notches 124 formed in the cutting edge and a notch 125 and an opening 126 adjacent thereto in each end portion of the knife. Each knife is attached to the rotor plate 118 by means of the bolts 121, mentioned above, one of the bolts extending through the opening 126 and the other bolt extending through the notch 125. If the knife should strike an obstruction, such as a rock, stump or the like, the end of the knife held by the innermost bolt 121, which extends through the slot 125, swings out from the bolt about the other bolt 121 as a pivot into the position shown in dotted lines in the lower left hand portion of Figure 6, thus permitting the knife to pass over the obstruction without breakage of any of the parts. It is then a simple matter to loosen the innermost bolt 121 slightly, restore the knife 122 to its normal position and then tighten these bolts 121 the necessary amount to secure the desired frictional release characteristics. The knives 122 may be reversed end to end when one end is worn beyond its efficient usefulness. As best shown in Figure 8, the plane of operation of the rotor knives lies an appreciable distance, represented by the reference character D in Figure 8, rearwardly of the end of the associated stalk-guiding tunnels 35. The particular purpose of this arrangement is to cause the knives not only to disintegrate or shred the stalks but, in doing so, to exert some tendency to draw the stalks rearwardly through the tunnel. As best shown in Figure 8, during the act of cutting or shredding the stalks, each stalk is bent slightly around the side of the tunnel 35, somewhat as indicated in dotted lines in Figure 8, so that the knives 122 act to pull the stalks, particularly the loose or detached stalks, rearwardly through the tunnels or stalk-guiding means 35. This stalk movement aids in preventing the stalks from lodging or becoming jammed in the tunnel, particularly after the lower or root portions of the stalks have been severed.

A shield structure 130 surrounds the rotatable knives and will now be described. The shield 130 includes a front plate 131 bolted, as at 132, to the lower portions of the angles 46 of the subframes 45 and, as at 133, to the upper end portions of said angles. A channel-like U-shaped top member 136 is welded or otherwise firmly fixed to the front plate or sheet 131 and to a rear sheet or plate 137, the lower edge 138 of which lies above the lower edge 139 of the front sheet 131 so as to provide a space S at the rear of the shield 130 to provide for egress of the shredded plant material. A U-shaped guard part 142 is fixed at its ends to the sides of the top section 136 and, as best shown in Figure 2, is disposed at the rear of the space S so as to prevent persons or animals from inadvertently coming into contact with the rotating knives, yet the part member 142 does not appreciably interfere with the distribution or egress of the shredded plant material. Lower intermediate and end front plates 146, 147 and 148 are fixed, as by bolts 149, to the lower edge of the front main sheet 131, and the adjacent ends of the lower plates 146—148 are bolted, as at 151, to the rear ends of the stalk-guiding tunnels 35. Preferably, the rear end portions of the tunnels are reenforced by shear straps 153 and 154 disposed on the associated parts in such position as to cooperate with the rotating knives 122, as best shown in Figure 2.

As also best shown in Figure 2, the left hand rotor, rotating clockwise, as shown in Figure 6, directs material generally toward the left end of the shield structure 130. In order to prevent soil and the like from building up on the left end of the shield 130, this portion of the upper member 136 of the shield terminates at about the level of the lower edge 139 of the front sheet 131. At this point a flexible sheet, formed of rubber or rubber-like material is fixed, as by a pair of bolts 157 and a strap member 158, to the lower left end portion of the upper shield member 136. The flexible member is indicated by the reference numeral 160 and normally hangs downwardly in the position shown in Figure 6, the member 160 being folded upwardly in Figure 2 in order to show other parts of the stalk shredder somewhat more clearly. Since the member 160 is of flexible material and in operation is subjected to constant movement, any soil particles or the like, picked up by the rotating knives 122 and thrown against the left end of the shield member, do not tend to build up on the shield and thus interfere with the proper operation of the rotors, particularly the left hand rotor. In order to prevent material from building up in the upper interior generally central portion of the shield 130, the latter is provided with a V-shaped member 163 which is disposed in a position best shown in Figure 6. The member 163 prevents any substantial amounts of material building up on the shield which, if permitted to do so, would periodically be released and then fall in a relatively heavy mass and thus be thrown from the machine in the form of a lump, which would not be desirable, not only from the standpoint of suddenly overloading the rotating knives but also from the standpoint of securing a uniform distribution over the ground of the shredded material. The drive pulleys and belts, as well as the bearings and other portions of the drive mechanism, best shown in Figure 4, are protected by a generally triangular shield 165 which covers these parts and, cooperating with the lower plate members 146, 147 and 148 and the front shield plate 131, serves to prevent any of the shredded plant material from being thrown into the drive mechanism. The shield 165 is supported by bolts 166 and 167 on brackets 168 and 169, the former bracket being a part of the central bearing member 68 and the other bolts 167 connecting the shield 165 to a pair of brackets 169 (Figure 9) carried at the forward side of the front shield plate 131.

The front shield plate 131 is provided with a pair of oblong openings 175 (Figure 6) so as to receive and be passed in assembly over the hub portions 112 (Figure 7) of the associated driven pulleys 110. By virtue of the openings 175 in the front shield plate 131 being oblong, movement of the driven pulley bearings along the frame channel 22 is accommodated. However, in order to provide means to prevent any shredded plant material from being thrown forwardly through the openings 175, a guard plate 177 having a circular flanged opening 178 (Figure 7) snugly embracing the forward portion of the hub section 112 is connected to the shield plate 131 by bolts 181 passing through slots 182 formed in the shield plate 131 adjacent the oblong openings 175. Thus, by loosening the bolts 181 the guard plate 177 may be adjusted along the shield plate with the bearing members 90.

As mentioned above, the draft frames 2 are pivotally connected at their forward ends to depending brackets 8 and 9 fixed to the rear axle of the propelling tractor, and the stalk shredder as a unit is raised and lowered by the power take-off unit 15 of the tractor, acting through arms 17 and chains 19 to raise the rear ends of the draft frames 2 and the associated stalk-shredding mechanism. The position of the latter relative to the rear end portions of the draft frames 2 may be adjusted, as desired, by means of a pair of lock nuts 191 disposed on the forward threaded portion of a bolt member 192 pivotally connected at its upturned end 193 in the opening 48 of the upper member 47 of the associated sub-frame 45. Under some conditions of operation some resiliency may be desirable in this connection and, as best shown in Figure 10, longer members 195 may be substituted for the bolt members 192 and connected like the latter members to the sub-frame angles 47, extending at their forward ends through the associated bracket 196 that is fixed to the draft frame member 27. A set screw collar 197 at the rear of the bracket 196 serves as one limit, and a similar set screw collar 198 at the forward side, together with a spring 199 interposed between the set screw collar 198 and the bracket 196 provides the desired resiliency.

For operating under conditions where the stalks are broken down and lying between the rows, I provide a centrally mounted auxiliary stalk-guiding shoe unit indicated in its entirety by the reference numeral 200 in Figure 9. Referring now to this figure, the shoe unit 200 includes a shaped shoe element 201 fixed at the forward end of a bifurcated arm member 202, preferably made up of a pair of strap members 203 fixed at their forward ends to a bracket carried by the shoe 201 and spaced apart at their rear ends and pivotally connected to a pair of angle brackets 205 carried at the forward side of the frame channel 22. A rod 208 is pivotally connected at its lower end to one of the strap members 203 and at its upper end passes through a slot in an arm 211 carried by a rockshaft 212 supported for rocking movement in a pair of brackets 213 and 214 bolted to the innermost draft frame bars 6. An arm 216 is fixed to the left end of the shaft 212 and is pivotally connected by a link 217 to a part on the tractor, such as an upper extension 9a (Figure 3) formed on the right hand bracket 9 and apertured, as at 218, to receive the forward turned end of the link 217. Thus, as the stalk-cutting unit is raised by the tractor power lift, a rearward thrust will be exerted to the link 217 against the arm 216 so as to rock the shaft 212 in a direction to act through the arm 211 against a set screw collar 221 fixed to the upper end of the rod 208 so as to lift the auxiliary guiding unit 200 not only relative to the ground but also relative to the forward inner portions of the associated stalk-guiding tunnels 45. A spring 222 encircles the upper end of the rod 208 below the arm 211 and above a second set screw collar 223 so as to provide means for resiliently pressing the auxiliary guide unit 200 downwardly against the surface of the ground. In this way the shoe unit 200 diverts stalks lying on the ground into one or the other of the stalk tunnels 35.

The operation of the implement as so far described is believed to be apparent from the above description. Briefly, power from the tractor motor is delivered to the shredding unit through the telescopic shaft 84 and rotates the rotors at a speed sufficient to shred into small particles all stalks and the like which pass rearwardly through the guiding means 35. Preferably, the stalk-shredding unit is lowered to a point where the outer ends of the knives 122 pass at or slightly above the ground surface. The paths of rotation of the sets of knives are disposed a slight distance rearwardly of the rear ends of the tunnels, as best shown in Figure 8 so as to exert a tendency to pull stalks s through the tunnels as well as shred or comminute the plant material. The knives are rotated preferably at such speeds as to thoroughly and positively disintegrate the stalks and the like, such as cornstalks, cotton stalks and similar plant growth. If one of the knives should strike a rock or other obstruction the knife slips away from the innermost bolt by virtue of the slot 125, which forms one kind of friction brake means, but once the obstruction is passed centrifugal force pivots the released knife about the innermost bolt 121 so that the knife assumes a position sufficiently near its normal operating position as not to throw the machine seriously out of balance until the same can be stopped and the innermost bolt 121 loosened to permit a repositioning of the knife and then tightened to establish the desired frictional connection at this point.

Figure 11:
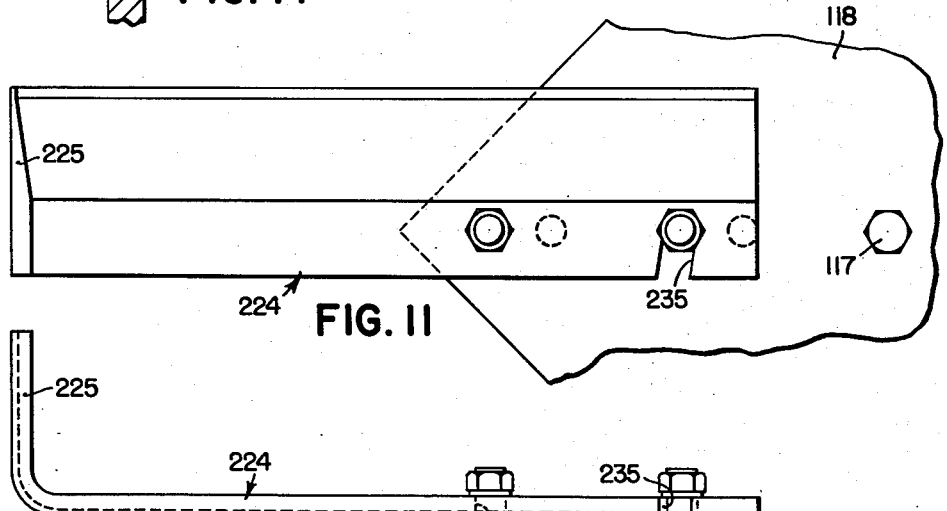
Figure 11 is a top plan view of a modified form of stalk shredding element.
Figure 12:
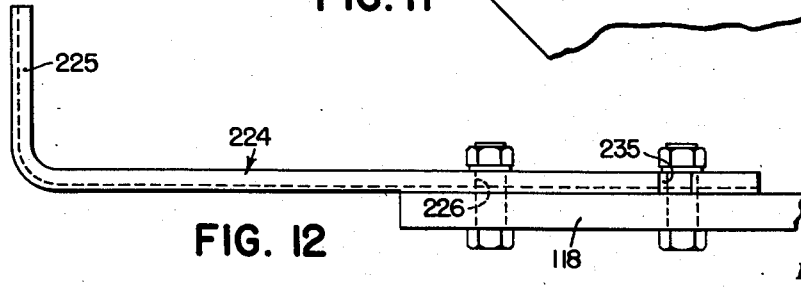
Figure 12 is a side view of the stalk shredding element shown in Figure 11.

For operating on smaller slender upright stalks, which might under certain conditions be by-passed by the usual knives such as stalks that might be so small as to remain untouched between successive paths of movement of the several knives, the form of knife shown in Figure 11 may be used to replace the knives 122 described above. Referring now to Figures 11 and 12, each knife is indicated by the reference numeral 224 and includes a rearwardly turned end 225 having sufficient axial dimension so that the knives 222 effectively contact all material. The knife 222 is provided with a pivot hole 226 to receive the outermost attaching bolt 121 and a release slot 235 to receive the innermost attaching bolt 121, the knives 224 being mounted substantially the same way as the knives 122 shown, for example, in Figure 6.

Figure 13:
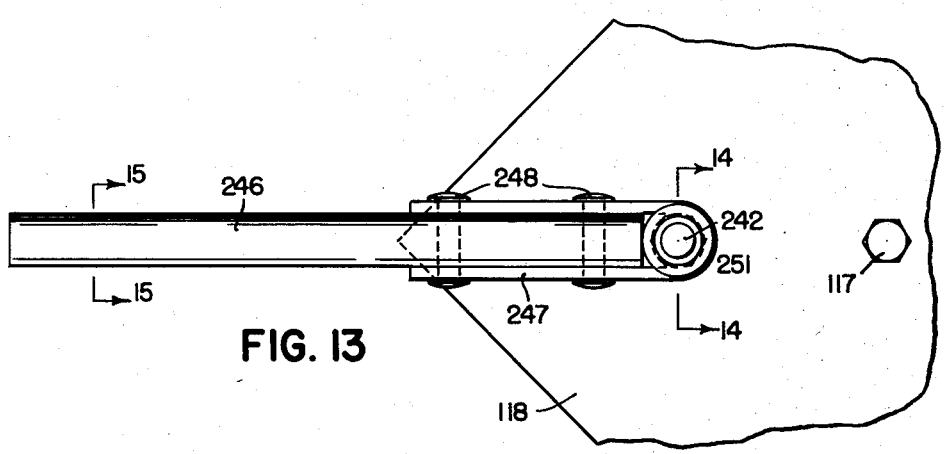
Figure 13 is a top plan view of a further modified form of stalk shredding element.
Figures 14, 15:
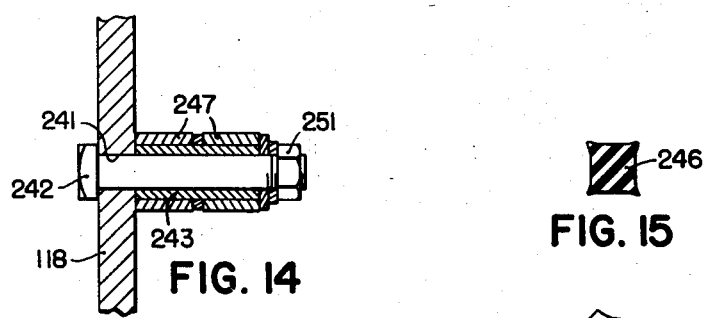
Figure 14 is a sectional view of the mounting taken on line 14—14 of Figure 13.
Figure 15 is a sectional view of the resilient blade, taken on line 15—15 of Figure 13.

A further form of stalk-shredding unit is shown in Figures 13–15. Referring now to these figures, the rotor plate 118 is apertured, as at 241, to receive a bolt 242 which extends through the associated aperture 241 in the plate 118 and through a pair of bushings 243 and 244 disposed on the bolt 242 with a washer 245 therebetween. Instead of providing stalk-shredding knives, in this form of the invention I provide a pair of rubber or rubber-like beating bars 246 which are swingably mounted on the bushings 243 and 244 by straps 247, formed of belting or the like, and secured, as by rivets 248 to the inner ends of the beater bars. The belting straps 247 pass around the associated bushings between the washer 245 and the rotor plate 118 and an outer washer 249 carried at the outer end of the bolt 242. The bushings are slightly longer than the width of the belting strips 247 so that when the nut 251 is tightened the washers 249 and 245 are fixed firmly against the associated bushings 243 and 244, and the latter, in turn, are firmly fixed to the rotor plate 118 but without interfering with the free swinging action of the beater bars 246.

Figure 16:
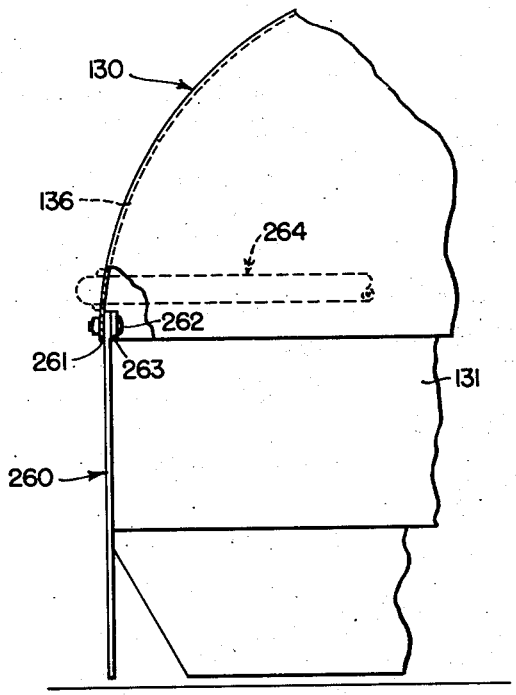
Figure 16 is a modified form of shield in which an extra length rubber flap is used to prevent the building up of material on the inside of the shield when operating under conditions where the material being shredded is damp and sticky, such as green cotton stalks.

Figure 16 shows a slightly modified form of shield construction, especially adapted for use under conditions where a tendency for soil and other particles to build up at the left side of the shield is quite pronounced, as when cutting up green cotton stalks. It has been found that when operating under such conditions, linty material from the unopened bolls, when shredded, tends to adhere to the sides of the shield, particularly at the left side of the left rotor, and especially when mixed with moisture from the shredded plant foliage. Under such conditions the function of the rubber flap unit 160, shown in Fig. 6, may be inadequate, and according to the principles of the present invention I provide an extra length flexible member indicated in its entirety in Figure 16 by the reference numeral 260. To provide for the installation of the extra length flap unit 260, the left side of the shield strip 136 is cut off at the point indicated by the reference numeral 261, the strip being drilled to provide openings to receive a pair of bolts 262 and an anchoring strap 263. When using the extra length rubber flap 260, the guard bar 142 may be moved to an upper position, as indicated by the reference numeral 264, or the guard bar may be fixed to the shield by the same bolts that secure the upper edge of the flap 260 in place.

Figure 17:
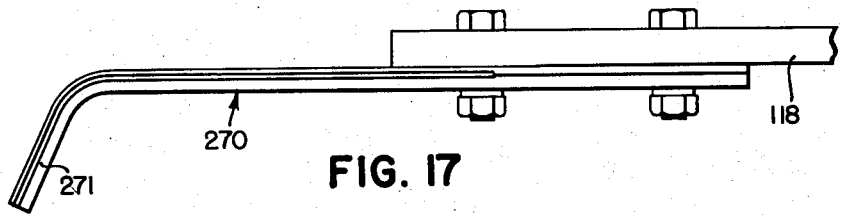
Figure 17 shows an end view of another form of stalk cutting knife, especially adapted for use in chopping green cotton stalks and other linty or fibrous plants.
Figure 18:
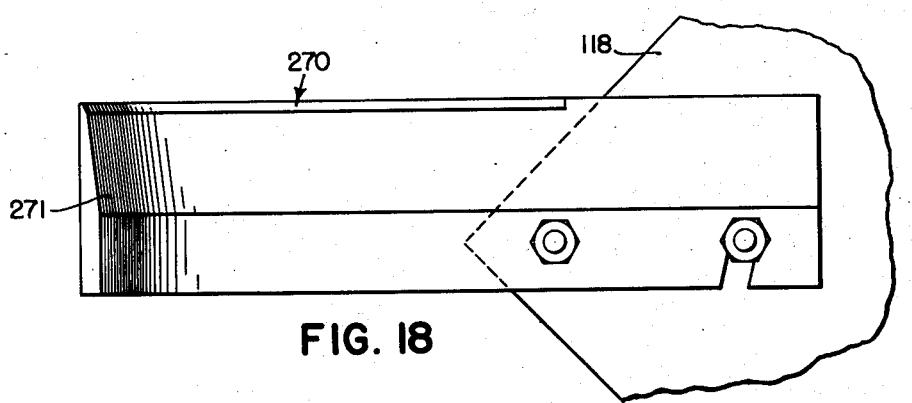
Figure 18 is a top plan view of the knife shown in Figure 17.

In Figures 11 and 12 I have shown a stalk-shredding knife especially adapted to operate on small slender stalks and having an extension 225 to insure that all of the stalks will be cut by the knives. Where the knives are provided with right angular extensions there may be some tendency for material to tend to hang onto the extensions, which might interfere with the proper shredding of the plants. In order to provide a type of knife in which there is no tendency for material to hang on the knife, the form shown in Figures 17 and 18 may be adopted. Referring to these figures, a knife or cutter blade 270 is shown as having an extension 271 which is disposed, not at right angles, but at an outwardly and rearwardly disposed angle. In one form the angle of the extension section 271 is approximately twenty-five degrees with respect to the axis of rotation of the rotor. Under most linty conditions, such as when chopping green cotton stalks or the like, that angle is sufficient to cause centrifugal force to act to strip any material that would tend to hang onto the extensions 271, yet by virtue of the extensions all of the plant material is shredded as the machine passes down the row. On the other hand, if it should be desired to have the knife extensions disposed perpendicular to the main body of the knife, as in order to operate close to the ground but without digging up too much soil, the form of knife or cutter blade shown in Figures 19 and 20 may be used. Referring now to these figures, the cutter blade 274 is shown as provided with a right angularly disposed blade extension 275, but the cutting edge 276 (Figure 20) of the latter is formed to make a retreating angle of about forty-five degrees. This permits linty and/or fibrous material to slip away from the knife extensions in operation.

If it should be desired to provide a stalk shredder, such as the one shown in Figure 1 et seq., with cutting blades having extensions, as in order to shred small upright stalks and the like, an auxiliary cutter blade extension, such as the one shown in Figures 21 and 22, may be provided for each of the cutter blades. The cutter blade extension is indicated in Figures 21 and 22 by the reference numeral 280 and comprises a main body portion 281 and an angularly disposed, generally rearwardly extending cutting section 282, the angle of the latter section being approximately twenty-five degrees with respect to the axis of rotation of the rotor. The body portion 281 of the cutter blade extension 280 is provided with a pair of bolt holes 284 to receive bolts 285 which fasten the extension to the outer end of the conventional blade or knife 122, which is mounted ordinarily as best shown in Figure 2. The provision of the cutter blade extension knives 280 has the advantage that the straight cutter blades may be used for most conditions of operation, the angular cutter blade extensions 280 being mounted directly on the conventional knives 122 in order to meet the conditions in which knife extensions are desirable. For example, straight knives 122 have been found to be quite adequate for practically all corn fields, but knives having extensions may be desirable when operating in cotton fields, as mentioned above.

Figure 23:
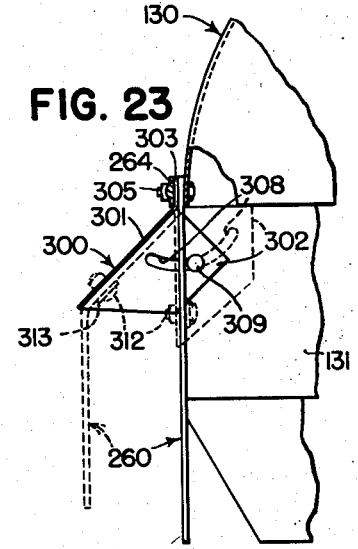
Figure 23 shows a rotor shield constructed as shown in Figure 16 but with the addition of a shield flap adjusting plate.

Figure 23 shows a shield flap adjusting plate which may be used with the extra length flap 260 shown in Figure 16. Referring now to Figure 23, the shield flap adjusting plate is indicated in its entirety by the reference numeral 300 and comprises a flat body portion 301 and a wing section 302 extending generally perpendicular to the plane of the body portion 301. The body portion 301 extends upwardly, as at 303, beyond the upper edge of the flange or wing section 302 and is apertured to receive a pair of bolts 305 which fasten the adjusting plate 300 to the shield, the bolts 305 passing through the openings which, in Figure 16, receive the bolts 262. The wing section 302 is provided with an arcuate slot 308 and lies on the forward side of the main shield sheet 131. The sheet 131 is apertured to receive a clamping bolt 309 which when tightened holds the shield 300 in different positions. For example, the shield flap adjusting plate 300 may be held in outwardly and downwardly extending positions, as shown in full lines in Figure 23, with the flap 260 hanging directly downwardly, in which case the shield plate 300 serves as a stop limiting the outward movement of the upper portion of the extra length flap 260. If desired, the flexible member 260 may be secured to the lower edge of the main body portion 301 of the adjusting plate by means of bolts 312 and a clamping strip 313. Even though the upper portion of the extra length flexible member 260 is, as just described, secured to the outwardly and downwardly extending adjusting plate 300, this portion of the flexible member 260, which is made of rubber or rubber-like material, serves to prevent material from building up at this portion of the rotor shield. The shield flap adjusting plate 300 is moved to different positions of adjustment by bending the upper part of the flap sheet portion 301 adjacent the bolts 305. If desired, the adjusting plate member 300 may be moved inwardly to the position shown in dotted lines in Figure 23, and the flexible member 260 secured to the lower edge of the section 301, in which case the flexible member 260 serves substantially the same purpose as the shorter flexible member 160 shown in Figure 1 et seq. In order to prevent sticky and/or linty material, or the like from building up in undesired quantities on the inside of the shield, the latter may be coated with rubber or rubber-like material or the like, applied to the inside surfaces of the shield by spraying or other means. If desired, the guard bar 264 may be fastened to the shield 130 by the bolts 305.

The stalk shredder unit 1 is shown in Figures 1, 3 and 5 as pivotally connected, as at 7, to the lower ends of the tractor-carried brackets 8 and 9, whereby the stalk shredder unit 1 is swingable about the axis defined by the pivots 7 when the unit is raised and lowered. Ordinarily, this provides sufficient clearance between the points 44 and the ground when the unit is raised for transport, but if it should be desired to provide for an increased clearance between the points 44 and the ground, the unit 1 may be connected with the tractor T by a system of parallel links, as shown in Figure 24. Referring now to this figure, a brace 320 is fixed to each of the attachment plates 10 and extends upwardly therefrom, generally midway between the associated depending brackets 8 and 9. The upper end of each bracket 320 is apertured, as at 321, to receive an adjusting swivel 322 in which the forward threaded end of an upper link 323 is disposed. The rear end of each of the upper links 321 has a downturned portion 324 which is disposed in the opening 48 in the associated upper frame bar 47, the links 323 replacing the stabilizing rods 192 and 195 (Figures 5 and 10). In order to provide resiliency, where desired, a spring 326 may be disposed about the forward end of each of the rods 323, forwardly of the adjusting swivel 322, each spring 326 acting between the associated swivel 322 and a forward lock nut 327. A rear lock nut 328 on each of the rods 323 normally determines the angle of the rock-gathering points 44. In the form of the invention shown in Figure 24, the stalk shredding unit is raised and lowered by connections 19 with the tractor power lift unit, as illustrated in Figure 3.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A tractor mounted stalk shredder comprising a unit including a frame, a generally fore and aft extending stalk-guiding means, and a stalk-cutting means carried by said frame at the rear end of said stalk-guiding means, a draft member adapted to be pivoted at its forward end to the tractor and pivotally connected at its rear end to said frame, whereby said frame, stalk-guiding means and said stalk-cutting means may pivot relative to the rear portion of said draft member and the latter, with said frame, stalk-guiding means and stalk-cutting means, may pivot relative to the tractor, and resilient means acting between said frame and said draft member for urging the forward portion of said stalk-guiding means down into contact with the ground.

2. Drive transmission means for a tractor mounted stalk shredder, comprising a frame including a transverse rigid cross bar, a bearing support rigidly fixed to the central portion of said cross bar, a drive shaft carrying a dual drive pulley mounted in said bearing support, a pair of laterally spaced outer bearing supports fixed rigidly to the end portions of said cross bar and each including a generally rectangular portion extending longitudinally of the cross bar, a pair of journal boxes mounted for sliding movement on said rectangular portions, respectively, each of said journal boxes including a flange portion guidingly engaging the adjacent edge of the associated rectangular bearing support portion, a pair of driven shafts, each carrying a driven pulley, mounted for rotation in said journal boxes, respectively, said driven pulley being disposed in the planes of said dual driving pulley, said journal box flange portions engaging the adjacent edge of said rectangular bearing support portions for constraining movement of said journal boxes to movement in or parallel to said planes, and means for driving said drive pulley.

3. A tractor mounted stalk shredder comprising a unit including a transverse frame having a pair of laterally spaced upwardly extending sections, and a pair of laterally spaced generally fore and aft extending stalk-shredding units, a pair of laterally spaced fore and aft extending draft frames adapted to be connected at their forward ends with the tractor, said draft frames having downturned portions at their rear ends, means pivotally connecting the lower ends of said downturned portions to said transverse frame, and adjustable means acting between each of said laterally spaced upwardly extending sections of said transverse frame and the upper ends of said rear downturned draft frame portions for adjusting the position of the forward portion of each of said stalk-shredding units.

4. In a tractor mounted stalk shredder including rotatable stalk shredding members and adapted to be mounted on a tractor, drive mechanism comprising a rigid transverse cross bar, an upwardly extending pedestal fixed to the central portion of said cross bar, journal means carried at the upper end of said pedestal, a drive shaft mounted in said journal means, a dual drive pulley fixed to the rear end of said drive shaft, a pair of laterally outer bearing supports having upper journal box receiving sections extending transversely and substantially parallel to the upper journal box receiving means of said pedestal, said laterally outer journal box receiving sections being slotted, a pair of journal boxes mounted for lateral adjustment along the slotted portions of said last mentioned sections, a flange on each laterally outer journal box disposed alongside the adjacent edge of the associated laterally outer bearing support and carrying means engaging said edge so as to restrain movement of said journal box to movement thereof substantially in a straight line toward and away from said drive shaft, and driven shafts journaled in said laterally outer journal boxes, each of said shafts carrying a driven pulley the plane of which coincides with one or the other of the planes of the sheave sections of said dual drive pulley, said slots lying substantially parallel to said planes whereby adjustment of said laterally outer journal boxes does not change the angularity between said drive and driven pulleys.

5. In a two row tractor mounted stalk shredder, a frame and tunnel construction comprising a transverse main frame member, a pair of stalk-guiding tunnels disposed in a generally fore and aft direction under the outer end portions of said transverse frame member, two pairs of vertical frame parts fixed at their upper ends to the forward side of said transverse frame member and at their lower portions to the sides of said tunnels, respectively, adjacent their rear ends, two pairs of laterally spaced generally vertically extending sub-frame members having lower portions fixed to the rear portions of said tunnels, respectively, said sub-frame members extending upwardly beyond said transverse main frame member, and a rotor-embracing shield carried on the upper portions of said sub-frame members.

6. In a two-row tractor-mounted stalk shredder, draft structure comprising a transverse frame member, generally vertical subframe members fixed at their lower portions to said transverse frame means, a pair of laterally spaced draft members, a pair of hitch means pivotally connected with the forward ends of said draft members, respectively, and adapted for attachment to the rear portion of said tractor, pivot brackets fixed to the ends of said transverse frame member, means for pivotally connecting the rear ends of said draft members with said pivot brackets, an upper link-receiving means on each of said hitch means, a pair of upper links, one disposed above each of said draft members, pivotally connected with said upper link-receiving means, respectively, and means pivotally connecting the rear ends of said upper links with the associated subframe members.

7. In a two-row tractor-mounted stalk shredder, draft structure comprising a transverse frame member, generally vertical subframe members fixed at their lower portions to said transverse frame means, a pair of laterally spaced draft members, means pivotally connected with the forward ends of said draft members, respectively, and adapted for attachment to the rear portion of said tractor, pivot brackets fixed to the ends of said transverse frame member, means for pivotally connecting the rear ends of said draft members with said pivot brackets, each of said draft members comprising an L-shaped portion including a downwardly extending section at the rear end of each of said draft members, the lower portions of said downwardly extending sections being pivotally connected to said pivot brackets, and position-adjusting means acting between the upper portions of said sub-frame members and said draft members adjacent the uppermost portions of said downwardly extending sections thereof.

8. In a stalk shredder, a frame, a driven shaft, means for mounting said shaft on said frame, a pulley fixed to said shaft and including a generally axially extending hub section, a stalk shredder unit connected directly to said axially extending hub section at points spaced radially outwardly of said shaft so as to receive the driving effort without having the power delivered through said shaft.

9. Draft structure for a tractor mounted stalk shredder comprising a unit including a transverse frame having a pair of laterally spaced upwardly extending sections, said draft structure including a pair of laterally spaced fore and aft extending draft frames adapted to be pivotally connected at their rear ends to said transverse frame adjacent the lower portions of said upwardly extending sections and adapted to be connected at their forward ends with the tractor, a pair of links disposed above said draft frames, respectively, and adapted to be pivotally connected at their forward ends with the tractor, and means for pivotally connecting the rear ends of said links with the upper portions of said laterally spaced upwardly extending frame sections.

10. The invention set forth in claim 9, further characterized by a pair of attachment plates, attachable to the tractor in laterally spaced relation, a pair of vertically extending parts carried thereby, and means for pivotally connecting the forward ends of said links and said draft frames to the upper and lower portions of said vertically extending parts.

11. In a stalk shredder, a frame, a driven shaft, means for mounting said shaft on said frame including a bearing section extending axially beyond the adjacent portion of the frame, a pulley fixed to said shaft and including a generally axially hub section adapted to be fixed to said shaft and a hollow, bell-like section extending axially inwardly from one end of said hub section in embracing relation relative to the other end of said hub section, said bell-like section extending axially inwardly beyond said other end of said hub section a distance sufficient to embrace and lie radially outwardly of the outer end of said bearing section, a grooved belt-receiving portion on the peripheral portion of that part of said bell-like section that lies radially outwardly of said bearing section, and a stalk-shredding unit connected directly to said one end of the hub section at points radially outwardly of said shaft.

EMIL F. OHLENDORF.

References Cited in the file of this patent

UNITED STATES PATENTS

| Number | Name | Date |
| --- | --- | --- |
| 420,248 | Sater | Jan. 28, 1890 |
| 657,411 | Hamm | Sept. 4, 1900 |
| 988,844 | Wilson | Apr. 4, 1911 |
| 1,619,797 | Martikainen | Mar. 1, 1927 |
| 1,740,069 | Chase | Dec. 17, 1929 |
| 1,836,666 | Katzfey | Dec. 15, 1931 |
| 2,389,790 | Leeper | Nov. 27, 1945 |
| 2,479,510 | Pollard et al. | Aug. 16, 1949 |
| 2,505,952 | Fergason | May 2, 1950 |
| 2,506,054 | Agee et al. | May 2, 1950 |
| 2,517,401 | Millard et al. | Aug. 1, 1950 |
| 2,534,481 | Spraker | Dec. 19, 1950 |